United States Patent

[11] 3,582,826

| [72] | Inventor | Giorgio Del Zotto<br>Milan, Italy |
|---|---|---|
| [21] | Appl. No. | 814,119 |
| [22] | Filed | Apr. 7, 1969 |
| [45] | Patented | June 1, 1971 |
| [73] | Assignee | Ates Componenti Elettronici S.p.A.<br>Milan, Italy |
| [32] | Priority | Apr. 5, 1968 |
| [33] | | Italy |
| [31] | | 14.862A/68 |

[54] TRANSISTOR BLOCKING OSCILLATOR FOR TRIGGERING AN INTERMITTENTLY ENERGIZABLE LOAD
8 Claims, 5 Drawing Figs.

[52] U.S. Cl..................................................... 331/112,
321/2, 331/148
[51] Int. Cl..................................................... H03k 3/30

[50] Field of Search............................................ 331/112;
1/146, 148; 321/2

[56] References Cited
UNITED STATES PATENTS
3,161,836  12/1964  Miller........................... 331/112
3,435,320  3/1969  Lee et al...................... 331/112X

*Primary Examiner*—Roy Lake
*Assistant Examiner*—Siegfried H. Grimm
*Attorney*—Karl F. Ross

ABSTRACT: A DC to DC converter, forming part of a trigger system for a photoflash lamp powered by a small battery, comprises a blocking oscillator with two transistors connected in cascade and with a regenerative circuit leading via a feedback transformer by way of respective capacitors to the bases of the two transistors in parallel, the emitter-collector path of one transistor lying in series with the base-emitter path of the other transistor.

PATENTED JUN 1 1971

PRIOR ART

Giorgio Del Zotto
INVENTOR.

BY

Karl G. Ross
Attorney

TRANSISTOR BLOCKING OSCILLATOR FOR TRIGGERING AN INTERMITTENTLY ENERGIZABLE LOAD

My present invention relates to a trigger system for the intermittent energization of photoflash lamps and similar loads which are to be powered by direct-current sources of limited capacity.

In portable photographic equipment, for example, the only available power source is generally a small battery which, in a conventional trigger system, drives a transistor forming part of a blocking oscillator whose output periodically charges a condenser until the voltage thereof has reached the necessary level to set off the photoflash. The length of time required to charge the condenser depends on the operating frequency of the blocking oscillator and on the charging energy available during each cycle. With a battery having a terminal voltage of 7 v. and an output condenser having a capacitance of 450 $\mu f.$, a minimum charging time of 2.5 seconds (for a voltage rise from 0—400 v.) and an efficiency of not more than 48 percent has heretofore been realized.

The general object of my present invention is to provide an improved trigger system of the character set forth which, under otherwise identical conditions, reduces the charging time and improves the efficiency in order to allow a more rapid succession of flashes and to extend the service life of the battery.

I have found, in accordance with the present invention, that this object can be realized by the provision of a blocking oscillator including two transistors connected in cascade, i.e. a main or switching transistor and an ancillary or pilot transistor with the emitter-collector circuit of the latter connected in series with the base-emitter circuit of the former. The emitter-collector circuit of the main transistor is connected, in series with the source of driving voltage, across a primary winding of a feedback transformer having a secondary winding regeneratively connected between the emitter of the main transistor and the bases of the two transistors, the regenerative feedback path advantageously including a respective capacitor in series with each base. This capacitive connection constitutes a low-dissipation input circuit for the two transistors so that relatively little energy is lost in driving the blocking oscillator. As the collector current of the ancillary transistor is substantially equal to the base current of the main transistor, and as the magnitude of this current depends upon the feedback voltage from the secondary winding of the transformer, the ancillary transistor can be maintained in a nonsaturating, controllable state by a limitation of the rise of the collector current of the main transistor, for which purpose I prefer to insert an inductance in series with the emitter-collector path of that transistor. This inductance, when connected across the two collectors, will also help cut off the ancillary transistor as soon as the main transistor ceases to conduct.

According to a further feature of my invention, an isolating resistor is connected to the base of the main transistor in series with the capacitor thereof, ahead of the junction of that base with the emitter of the ancillary transistor. This resistor, aside from helping develop the necessary potential difference between the base and the emitter of the latter transistor, also serves to suppress spurious oscillations which could be generated by the leakage inductance and the stray capacitance of the feedback transformer.

With the overall current gain of the system approximately equal to the product of the individual gains of the two transistor stages, the blocking oscillator operates at an elevated frequency when compared to the conventional one-transistor photoflash trigger. Its efficiency, with the parameters given above, reaches about 70 to 75 percent, the charging time being 2 seconds.

The invention will be described in greater detail with reference to the accompanying drawing in which.

Figure 1:
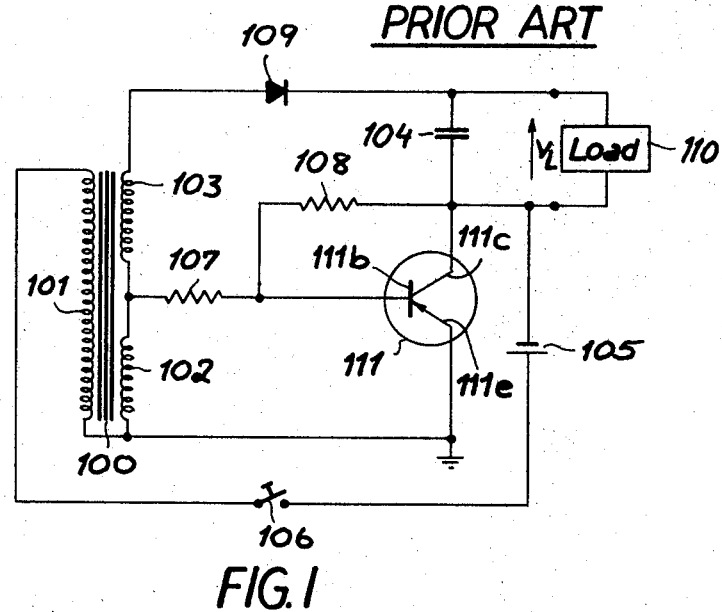
FIG. 1 is a circuit diagram of a conventional trigger system for photoflash bulbs.

In FIG. 1 I have shown a photoflash trigger of the prior art, comprising a feedback transformer 100 with a primary winding 101, a secondary winding 102 and a further winding 103; an output condenser 104, connected across winding 103 in series with two resistors 107, 108 and a charging diode 109; and a transistor 111 having its base 111b connected through a resistor 107 to the junction of windings 102, 103 and having its emitter 111e (shown grounded) connected to the other terminal of winding 102, a source 105 driving voltage being connected between emitter 111e and the collector 111c of transistor 111 in series with primary winding 101. Base 111b is returned to collector 111c through resistor 108 which, together with resistor 107, forms a voltage divider for conductively biasing the base-emitter circuit of the transistor upon closure of a switch 106 in series with battery 105. A load 110, such as a photoflash bulb, is connected across condenser 104.

Figure 3:
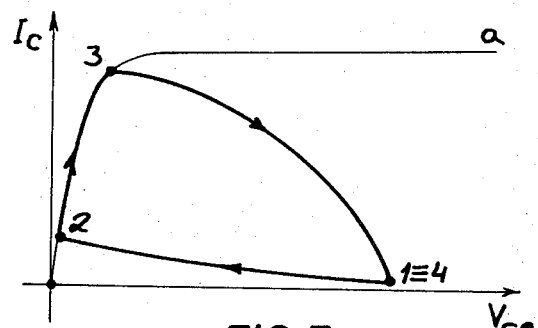
FIG. 3 is a graph of collector current versus collector/emitter voltage in the system of FIG. 1, illustrating the shifts of the operating point during a cycle.

In the operation of the conventional system of FIG. 1, closure of switch 106 initiates the flow of collector current through transistor 111 and through winding 101, thereby inducing in winding 102 a regenerative voltage which further biases the base 111b negatively so that the collector current rises virtually linearly toward saturation. This has been illustrated in FIG. 3 where the point 1 of the $I_cV_{ce}$ diagram represents the quiescent state (switch 106 open), point 2 corresponds to the instant of closure, and point 3 indicates the leveling-off of the current $I_c$ at a bend in the saturation characteristic $a$ of the transistor. At this point the absolute value of the negative base voltage of transistor 111 begins to decrease and the system advances quickly to the cutoff state 4 which coincides with point 1.

Figure 4:
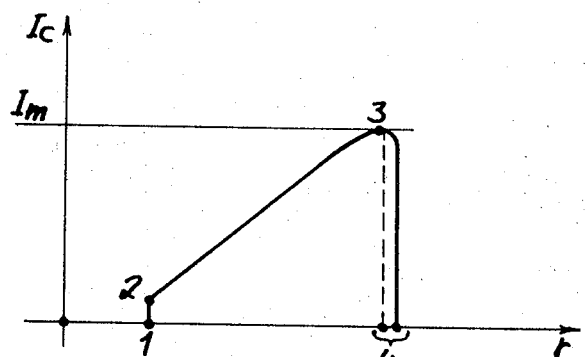
FIGS. 4 and 5 are graphs of collector current and collector/emitter voltage, respectively, plotted against time for the prior-art system of FIG. 1 and for the improved system of FIG. 2.
Figure 5:
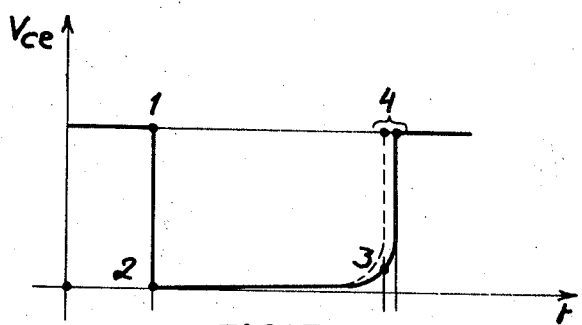

FIGS. 4 and 5 illustrate, in full lines, the change in collector current $I_c$ and collector/emitter voltage $V_{ce}$ as functions of time $t$. It will be noted that the transition from point 3 (current $I_c$ at its maximum value $I_m$) to point 4 is not instantaneous but begins with a somewhat gradual current drop and voltage rise as the potential of base 111b is modified by the reversal of the voltage induced in secondary winding 102.

The same voltage reversal takes place in winding 103 so that diode 109 begins to conduct, thereby charging the condenser 104. When the secondary voltages have decayed sufficiently, base 111b goes again negative to restart the cycle. In this way, with the diode 109 preventing the condenser 104 from discharging between cycles, the load voltage $V_L$ thereacross builds up progressively until the load 110 is triggered, thereby discharging the condenser.

Figure 2:
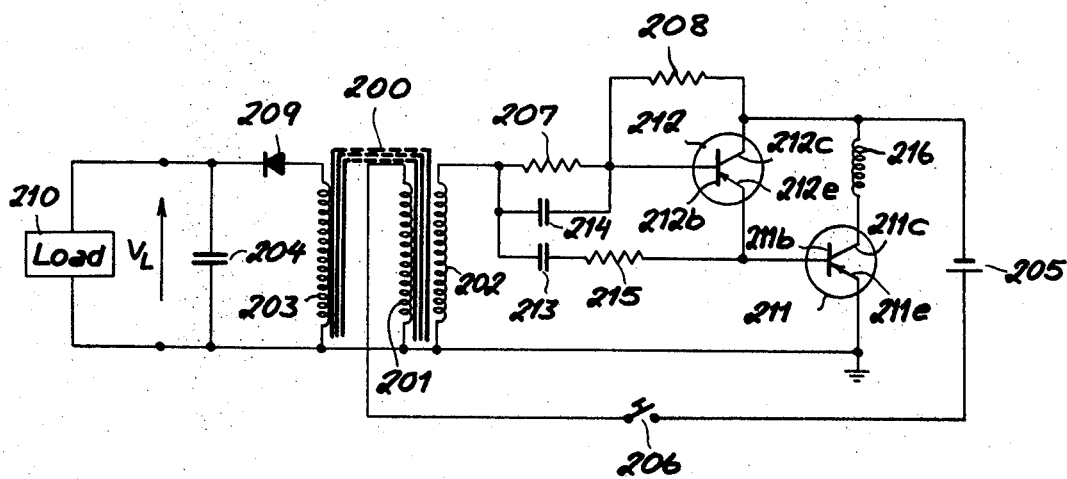
FIG. 2 is a circuit diagram similar to FIG. 1 illustrating my present improvement.

In FIG. 2 the single transistor 111 of the conventional system has been replaced by a pair of cascaded transistors 211, 212, the collector 212c and emitter 212e of pilot transistor 212 being connected in series with the base 211b and emitter 211e of switching transistor 211 across the series combination of voltage source 205 with the primary 201 of transformer 200. Transformer secondary of again has one terminal tied to the grounded emitter of main transistor 211, its other terminal being connected to the bases 211b, 212b of transistors 211, 212 via a pair of parallel branch circuits including respective capacitors 213 and 214. A voltage divider constituted by resistors 207, 208 is again inserted between one (i.e. the negative) terminal of battery 205 and the ungrounded end of secondary 202, the junction of these resistors being tied to base 212b so that resistor 207 bridges the capacitor 214. A further resistor 215 is connected to base 211b, in series with capacitor 213, ahead of the junction of that base with emitter 212e so as to form part of the input circuit of transistor 212, thereby generating an additional voltage drop between this emitter and the high-voltage terminal of feedback winding 202. The voltage drop across this resistor, however, is relatively small so that little energy is dissipated by the flow of biasing current from winding 202 to base 211b during the conductive phase 2-3. During that phase, also, the biasing current for transistor 212 passes to a substantial extent through capacitor 214 so that the energy stored therein, together with that stored in capacitor 213, is available during the subsequent cutoff phase 3-4 to charge the output condenser 204 via winding 203 and diode 209.

An inductance coil 216, bridging the collectors 211c and 212c, lies in series with battery 205, switch 206, winding 201 and transistor 211 so as substantially to linearize the rise of load current in the presaturation stage. When the transistor 211 cuts off, the reverse voltage developed across this inductance also accelerates the return of transistor 212 to its nonconductive state.

Thus, the load 210 connected across condenser 204 is more efficiently energized, after a reduced number of cycles, with the switchover from point 3 to point 4 occurring almost instantaneously as indicated in dotted lines in FIGS. 4 and 5. This mode of operation greatly foreshortens the interval during which both the collector current $I_c$ and the collector/emitter voltage $V_{ce}$ have significant magnitudes so as to dissipate substantial amounts of battery energy.

With the arrangement shown in FIG. 2, therefore, the number of possible energizations of load 210 per unit of time is greatly increased, in comparison with the system of FIG. 1, and the more efficient use of the current output from battery 205 ensures a longer service life for the latter. Whereas the transistors shown in the drawing are of the PNP type, it will be understood that, with suitable reversals of polarity, they could also be of the NPN type.

I claim:

1. A circuit arrangement for triggering an intermittently energizable load, comprising a first transistor with a first base, a first emitter and a first collector; a second transistor with a second base, a second emitter and a second collector, said second emitter and collector being connected in series with said first base and emitter; a source of DC driving voltage; a feedback transformer with a primary winding connected in series with said source between said first emitter and said first and second collectors; an inductance in series with said source between said first and second collectors; an input circuit including a secondary winding of said transformer regeneratively connected between said first emitter and said first and second bases for intermittently driving said first transistor to saturation; and a load circuit including a further winding of said transformer.

2. A circuit arrangement as defined in claim 1 wherein said input circuit has a first and a second branch respectively terminating at said first and second bases, each of said branches including a series capacitance.

3. A circuit arrangement as defined in claim 1 wherein said load circuit comprises an output condenser connected in a charging circuit across said further winding, and a diode in said charging circuit for preventing a discharge of said condenser through said further winding.

4. A circuit arrangement as defined in claim 3 wherein said diode is poled to enable the charging of said condenser only upon a diminution of current flow through said primary winding.

5. A circuit arrangement for triggering an intermittently energizable load, comprising a first transistor with a first base, a first emitter and a first collector; a second transistor with a second base, a second emitter and a second collector, said second emitter and collector being connected in series with said first base and emitter; a source of DC driving voltage; a feedback transformer with a primary winding connected in series with said source between said first emitter and said first and second collectors; an input circuit including a secondary winding of said transformer regeneratively connected between said first emitter and said first and second bases for intermittently driving said first transistor to saturation, said input circuit having a first and a second branch respectively terminating at said first and second bases, each of said branches including a series capacitance; and a load circuit including a further winding of said transformer.

6. A circuit arrangement as defined in claim 5 wherein said first branch further comprises a first resistor in series with the capacitance thereof and said second branch comprises a second resistor in shunt with the capacitance thereof.

7. A circuit arrangement as defined in claim 6 wherein said first resistor is inserted in said first branch ahead of a junction of said first base with said second emitter.

8. A circuit arrangement as defined in claim 6, further comprising a third resistor connected between said second base and said second collector.